United States Patent [19]

Stuhlman

[11] 4,404,961
[45] Sep. 20, 1983

[54] APPARATUS FOR COLLECTING SOLAR ENERGY

[76] Inventor: Frank A. Stuhlman, Rte. 5, Weller Dr., Plainfield, Ill. 60544

[21] Appl. No.: 207,558

[22] Filed: Nov. 17, 1980

[51] Int. Cl.³ .............................................. F24J 3/02
[52] U.S. Cl. .................................... 126/432; 126/424; 126/428; 126/450
[58] Field of Search ............... 126/450, 443, 442, 438, 126/417, 425, 424, 437

[56] References Cited

U.S. PATENT DOCUMENTS

| | | | |
|---|---|---|---|
| 3,949,732 | 4/1976 | Reines | 126/429 |
| 4,126,123 | 11/1978 | Hall | 126/426 |
| 4,137,903 | 2/1979 | Annett | 126/443 |
| 4,154,657 | 5/1979 | Dennen | |
| 4,166,769 | 9/1979 | Dukess | |
| 4,306,544 | 12/1981 | Clemens | 126/450 |
| 4,344,418 | 8/1982 | Leroy | 126/443 |

FOREIGN PATENT DOCUMENTS

| | | | |
|---|---|---|---|
| 22686 | 1/1981 | European Pat. Off. | 126/450 |
| 2367993 | 6/1978 | France | 126/432 |
| 54-40343 | 3/1979 | Japan | 126/450 |

OTHER PUBLICATIONS

E. Moran–Solar Bubble/Popular Science, Sep. 1976, pp. 101, 154.
E. Moran–Focusing Collectors/Popular Science, Dec. 1976, pp. 60-61.
N. Davis & L. Lindsey–Concentrating on Collection/At Home in the Sun, 1979, pp. 154-159.

Primary Examiner—James C. Yeung
Attorney, Agent, or Firm—Hill, Van Santen, Steadman & Simpson

[57] ABSTRACT

A solar collector has a nonlinear collecting surface, for example, a substantially spherical surface, such collector being positioned perpendicular to the rays of the sun throughout the day thereby providing a constant level of solar energy collection. The collector has a hollow body where absorption of the collected heat takes place by a heat transferring fluid being either a liquid or a gas. Provisions are made for increasing the absorptive efficiency of the collector and for reducing radiant heat loss.

8 Claims, 8 Drawing Figures

APPARATUS FOR COLLECTING SOLAR ENERGY

BACKGROUND OF THE INVENTION

1. Field of the Invention

The present invention relates to solar energy collection devices, particularly those employing collecting surfaces of a spherical shape.

2. Description of the Prior Art

Solar energy collectors are generally comprised of a flat collecting plate, usually having a top surface blackened or in some other manner made more absorptive of solar energy. A heat transferring medium such as water or air is then brought in contact with the plate either against the top surface or the bottom surface and then removed to a point of utilization. Most commonly, a transparent glass plate is positioned above the blackened flat collecting plate to retain the heat produced by the absorption of the solar energy by the collecting plate.

If the flat plate is retained in a stationary position, such as mounted on the roof or wall of a house, the effective surface area "seen" by the sun changes throughout the day from a thin rectangle early and late in the day to a wider rectangle at midday. Additionally, throughout the year, the north-south movement of the sun's position in the sky changes the angle at which the sun's rays strike a fixed surface. Since the most effective heating is produced by rays which are received perpendicular to the surface of the collecting member, the stationary flat plate devices can present such a perpendicular posture toward the sun only during a very brief portion of the day and then only if the plate is positioned at the proper angle to the sun. This results in uneven energy absorption levels throughout the day and year.

There are devices which overcome a deficiency of the stationary flat plate collectors by employing a tracking clock mechanism which moves the flat plate collector to hold it in a perpendicular position relative to the rays of the sun. The tracking mechanism is an expensive and delicate device which must be calibrated precisely to track the sun throughout the day and provision must be made for changing the angle of the axis of the device to compensate for the north and south movements of the sun through the seasons of the year.

Other solar collectors employ collecting members which may be positioned at a focal point of a parabolic mirror. The mirror is used to concentrate the solar energy on a smaller surface thereby making the collecting member smaller. The same problem of aligning the collecting member or reflecting member with the sun is present in these devices.

Other solar collectors use a cylindrical collecting surface housed in a transparent enclosure to be exposed to the sun throughout the day. This collecting member is filled completely with water which heats up and is drawn off as required for use. However, this type of collector does not provide for proper orientation of the surface of the collector perpendicular to the sun throughout the day and year.

SUMMARY OF THE INVENTION

The present invention provides for a collecting member having a generally spherical or hemispherical collecting surface, which has its outer surface treated to improve solar energy absorption and has a hollow interior. The collecting member may be positioned in a stationary manner such that the collecting surface will be exposed to the sun throughout the day. Because of the nonlinear nature of the collecting surface along both the lateral and longitudinal axis, throughout the day and the year there will continually be an area on the surface of the collecting member which is positioned perpendicular to the rays of the sun. Additionally, the sun will always "see" an effective surface area equal to the cross sectional area of the spherical collecting member. Thus, an expensive tracking mechanism is not required to position the surface of the collecting member with reference to the sun. Also, the surface area presented toward the sun will be maximized with a spherical shape for a given space limitation.

In one embodiment of the invention, the hollow interior of the collecting member is to be completely filled with air. As the collecting member absorbs solar energy, heat transfer by conduction will cause the air inside the collecting member to heat. An inlet and an outlet are provided to the collecting member so that the heated air can be withdrawn from the collecting member to be used either to heat a building directly or to transfer heat to a heat storage unit or thermal reservoir, such as a pile of rock. After some of the heat has been removed from the air, the cooler air will be returned to the collecting member through the inlet to be reheated.

A second embodiment of the invention provides for a liquid heat transfer fluid to be used instead of a gaseous fluid. In such embodiment, the liquid is directed in the form of a spray throughout the generally air-filled hollow interior of the collector and into conductive contact against the side walls of the collector. The heated liquid collects in a pool at the bottom of the collector from where it is pumped to a heat exchange unit where some of the heat is removed from the liquid, and then the cooler liquid is returned to the collector for reheating.

Glass plates or other such protective devices and enclosures are not required with the spherical collecting member and the only moving parts necessarily required would be a pump means for moving the heat transfer fluid throughout the system.

An alternative embodiment of the invention provides a rotation mechanism which rotates the collecting member about a longitudinal axis approximately ½ turn in 12 hours. With this embodiment, generally the same surface area of the collector is directed toward the sun and the surface area not directed toward the sun is insulated to minimize radiant heat loss.

The rotational mechanism need not be as precise as the tracking mechanism employed in the prior art in that there is always an area on the surface of the collecting member perpendicular to the rays of the sun. At the end of each 12 hour cycle, the collector is rotated back to the original position so that the inlet and outlet tubing does not become tangled.

The efficiency of the system can be increased by mounting the collecting member above a reflective surface, for example by providing a reflective wall running in a generally east and west direction and, in the northern hemisphere, just to the north of the sphere. In this manner reflected solar energy could be absorbed by more surface area on the collector than is directly "seen" by the sun.

The collecting member may also have the shape of a hemisphere with its flat side pointed generally away from the sun, such as mounted on a flat wall like the side or roof of a building. This shape would still have the advantage that one area on the collecting member would be directly perpendicular to the rays of the sun throughout the day and year, however the area of the collecting member "seen" by the sun would change throughout the day from a semi-circle at early morning and late afternoon, to a full circle at midday.

DESCRIPTION OF THE PREFERRED EMBODIMENTS

Figure 1:
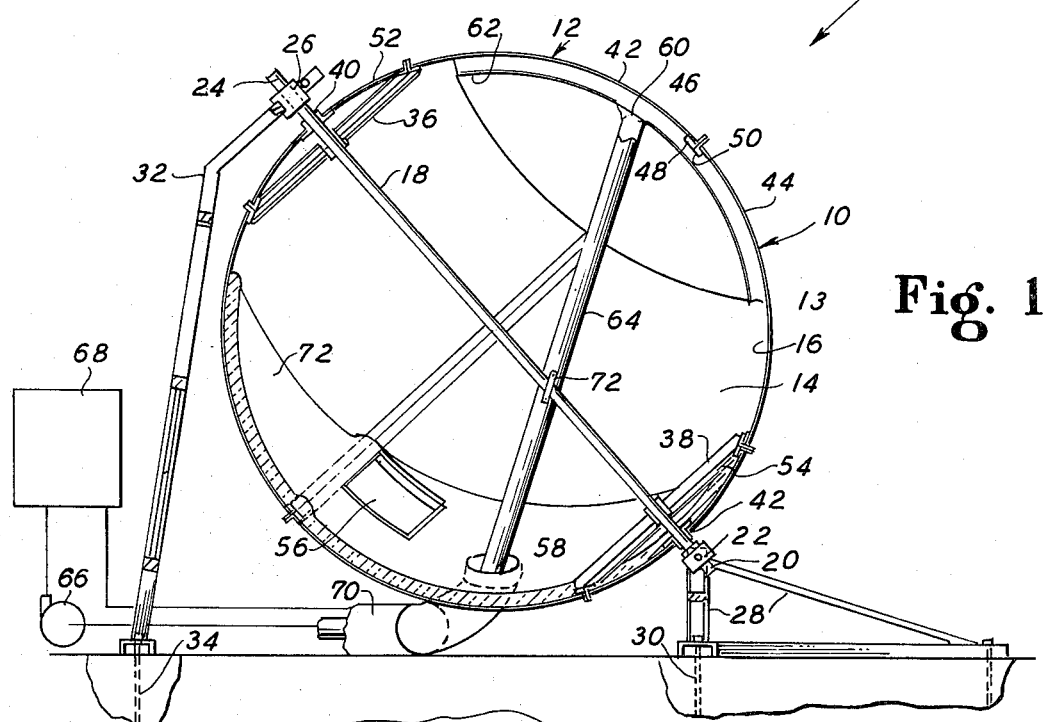
FIG. 1 is a side cross-sectional view of a solar collector.

In FIG. 1 there is shown generally at 10 a solar collector comprising a spherical collecting member 12 having an outer surface 13 which may be blackened or otherwise treated to improve solar energy absorption and a hollow interior 14 defined by an interior wall 16. The collecting member 12 is carried on a central supporting means 18 such as a rod extending through an axis of the sphere having a lower end 20 being received in a lower bearing member 22 and an upper end 24 being received in an upper bearing member 26. The lower bearing member 22 is held in a support fixture 28 which is permanently attached to the ground by appropriate footings 30.

Figure 2:
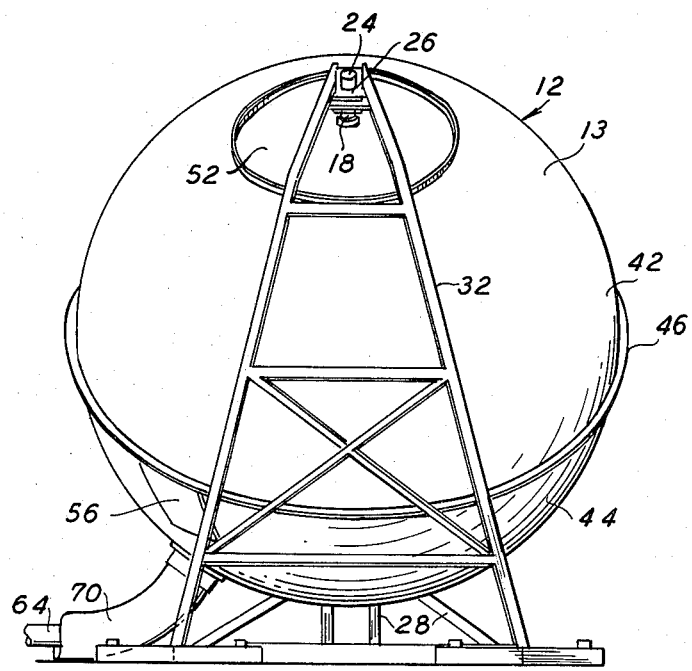
FIG. 2 is a rear view of the device shown in FIG. 1.

The upper end 24 carried in the upper bearing member 26 is mounted in a rear support frame 32 and can be best seen in FIG. 2 as comprising a generally A-shaped frame which is also secured to the ground by appropriate footings 34.

Internal support member 36, 38 are provided near the top and bottom respectively of the interior 14 of the collecting member 12 to add stability to the mounted collecting member 12. A seal 40 is provided near the top end 24 of the support member 18 and a second seal 42 is provided near the bottom end 20 to insure that the collecting member 12 is generally air-tight.

A commercially feasible source of large spheres which can be used as collecting members is readily available in the form of a pair of hemispherical dome silo roofs which can be joined at their open equator. Such an embodiment is shown in FIGS. 1 and 2, wherein a first dome silo roof 42 comprises the top half of the spherical collecting member 12 and a second hemispherical dome roof 44 comprises the bottom half of the collecting member 12. The two hemispheres 42, 44 are joined along their open equator at 46 by means of a pair of flanges 48, 50 attached to the top and bottom halves.

Standard dome silo construction provides for a cap at the top of the dome such as shown at 52 and 54 which aids in the placement and retention of the supporting members 36, 38. Also, standard dome silo roof construction provides for an access door such as shown at 56 which is useful in the construction and maintenance of the solar collector of the present invention.

Figure 3:
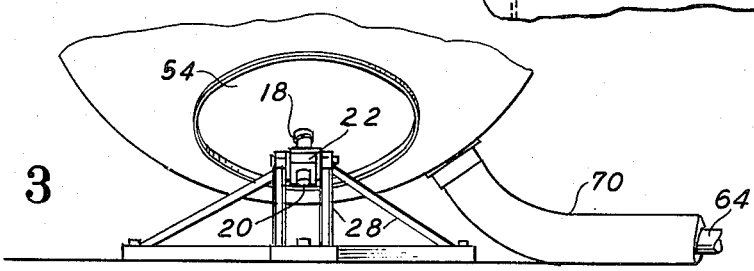
FIG. 3 is a partial front view of the device shown in FIG. 1.

In the preferred embodiment of the invention as shown in FIGS. 1, 2 and 3, air is used as the heat transferring medium. In this embodiment, the collector 12 is provided with an inlet opening 58 and an outlet opening 60 for the air. As it is desired to utilize the heated air within the collecting member 12, the outlet opening 60 is positioned near the top of the collecting member 12. Since hot air rises, the outlet will be positioned within the zone of warmest air.

Also, since the interior wall 16 of the collecting member 12 functions as a heating surface, it may be desirable to attach a dish-shaped member 62 complementing the shape of the collector 12 and being positioned close to the interior surface 16 of the collecting member 12 and having the outlet opening 60 therethrough such that exiting air will have to travel along the interior surface 16 before exiting through outlet opening 60. Outlet opening 60 is connected by means of a conduit 64 to the inlet of a pump means 66 which directs the air into a chamber 68 for utilization as warm air or for storage of the heat contained in the air by known means such as by directing the warm air across a pile of rock.

After some of the heat is removed from the air in chamber 68, the cooler air is returned via conduit 70 which is connected to the inlet opening 58 in the collecting member 12. The inlet opening 58 is positioned near the bottom end of the collecting member 12 to aid in forcing the warmer air upwardly. As a means of insulating the warm air being drawn through conduit 64 to the chamber 68, conduit 64 may be carried within conduit 70 such that the cooler returning air forms an insulating barrier completely around the warm air conduit 64 thus reducing the insulation required around conduit 70. Appropriate retaining means such as a strap 72 retaining warm air conduit 64 against the supporting member 18 may be used to hold the outlet opening 60 in the proper location.

The positioning of the collector shown in FIGS. 1–3 is not critical in that the same shape is presented from all directions. However, it is desirable that the side opposite the top supporting member 32 be directed in a southerly direction so that the shadow from the supporting member 32 will not fall on the collecting member 12. For this reason, the supporting rod 18 is shown to be tilted such that an unobstructed surface area of the collecting member 12 may be continually directed toward the sun. Thus for positioning in the northern hemisphere, the direction east would be directly into the drawing figure and the direction south would be to the right.

The interior surface 16 of the collecting member 12 could have a coating of insulation 74 covering the back and bottom "dark" side of the collecting member. Since the solar radiation falling on this area of the collecting member will be minimal, the insulation 72 will aid in preventing heat loss from the interior 14 of the collector 12.

Thus in operation, the solar energy in the form of sunlight will be absorbed by the blackened outer surface 13 which will cause the air within the hollow interior 14 of the collecting member 12 to heat up. This warmer air is removed from the collecting member through outlet opening 60 and outlet conduit 64 by means of the pump 66 to the chamber or room 68 for utilization. After some of the heat is removed from this warm air, the now cooler air is returned through conduit 70 and inlet opening 58 to the interior of the collecting member 12. Throughout the daylight hours, the same surface area will be "seen" by the sun, that is a circular shape will always be presented toward the sun, and an area on the collecting member 12 will always be perpendicular to the rays of the sun thereby providing for a collecting member having essentially a uniform collecting rate throughout every day of the year.

Figure 4:
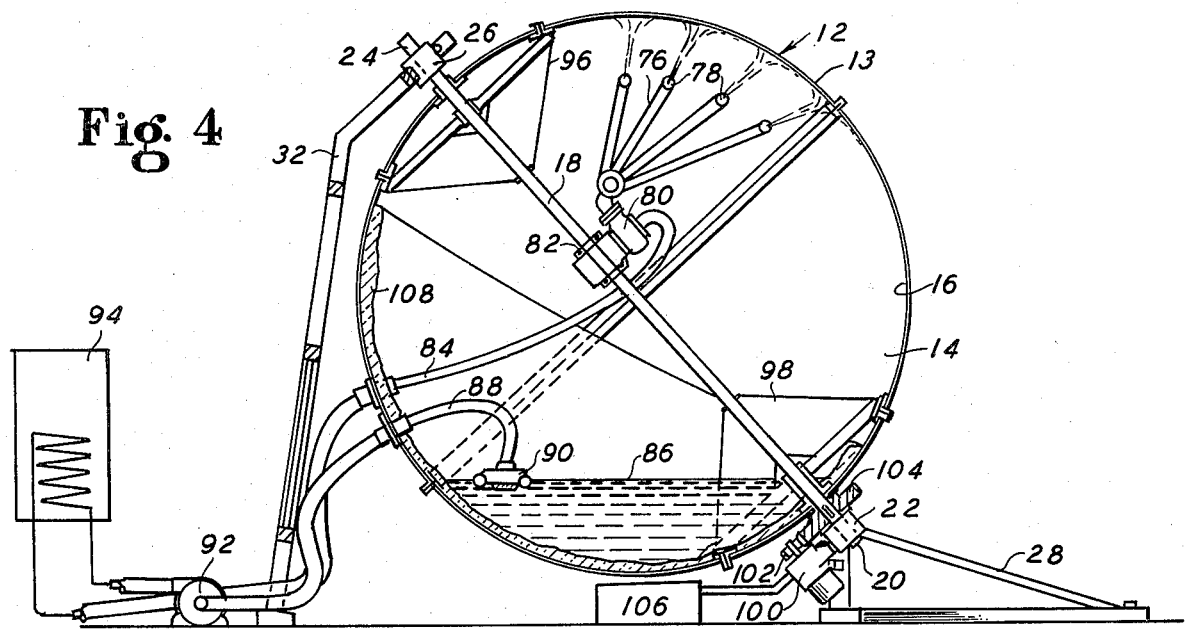
FIG. 4 is an alternative embodiment of the solar collector shown in FIG. 1.

In the alternative embodiment shown in FIG. 4, a liquid such as water is used as the heat transferring medium rather than air. In this embodiment the same collecting member 12 may be used which has the blackened outer surface 13 and the hollow interior 14 bounded by the inner surface 16. The collecting member is also carried on the supporting member 18 having the lower end 20 received in the lower bearing member 22 and the upper end 24 being received in the upper bearing member 26. The lower bearing member 22 is held by lower support member 28 and the upper bearing member 26 is held by the upper support member 32.

The differences involved in this embodiment include a spraying means 76 comprising a series of nozzles 78 which serve as inlet openings for the heat absorbing liquid. The spraying means 76 is operably connected to a pump 80 which may be attached to the supporting member 18 by appropriate fastening means 82. An inlet conduit 84 which extends through the wall 13, 16 of the collecting member 12 is attached to the pump 80 to supply the pump 80 with heat absorbing liquid.

The nozzles 78 direct the liquid at the interior surface 16 of the collecting member 12 and the liquid then runs down the inner surface 16 of the collecting member 12 to collect in a pool 86 at the bottom of the collecting member 12. This heated liquid is drawn from the pool through an outlet conduit 88 which may have at one end a floating intake means 90 having a passage therethrough to withdraw the heated liquid. The outlet conduit 88 passes through the wall 16, 13 of the collecting member 12 and is directed by means of a pump 92 to a chamber 94 where some of the heat is removed from the heated liquid for current use or storage.

The cooled liquid is then returned through inlet conduit 84 to the pump 80 for respraying and recirculation. Extra support gussets 96, 98 between the wall 13, 16 and the supporting member 18 may be required due to the increased load presented by the pool of liquid 86.

During the course of the day, if the collector 12 remains in a stationary position, different areas on the outer surface 13 of the collecting member will be the "hot spot," that is the area directly perpendicular to the rays of the sun. Thus in a stationary system, the spray nozzle 78 will direct the liquid not only at the particular hot spot at a particular time but also at cooler areas of the surface 13.

In order to increase the efficiency of the collector, a drive mechanism 100 such as an electric motor may be employed having a gear 102 which meshes with and drives a drive gear 104 mounted on the support member 18. The support member 18 may be rotatably mounted in the lower and upper bearings 22, 26 such that the drive motor 100 can be used to rotate the entire collecting member 12. Control means 106 such as a timing mechanism may be used to regulate the speed at which the collecting member should be rotated which may be at a continuous slow speed such that the collecting member rotates one-half turn every 12 hours and then is rotated in a reverse direction to the starting position. The collecting member 12 alternatively may be periodically rotated in small increments such that the "hot spot" will move across a given area before the collecting member 12 is rotated to return the "hot spot" to its starting position. Thus the means for rotating the collecting member 12 need not be as precise as the tracking mechanisms employed in the flat plate collectors in that the curved nature of the surface of the collecting member 12 reduces the accuracy and precision required for the positioning of the outer surface 13.

A layer of insulation 108 may be applied to the inner surface 16 of the collecting member 12 at the lower and rear "dark" side of the collecting member 12 to reduce heat loss during operation.

Figure 5:
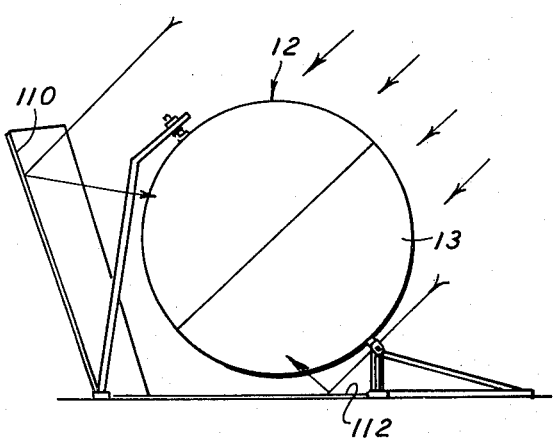
FIG. 5 is an alternative embodiment of the solar collector shown in FIG. 1 utilizing reflective surfaces.

FIG. 5 shows an alternative embodiment of the invention wherein reflecting surfaces 110, 112 are utilized to increase the effective absorbing surface area of the collecting member 12. The substantially vertical reflecting surface 110 may be curved to complement the shape of the collecting member 12 to focus a larger number of rays on the outer surface 13 of the collecting member 12. This embodiment may be employed with the embodiments shown in FIGS. 1, 2, 3 or 4.

Figure 6:
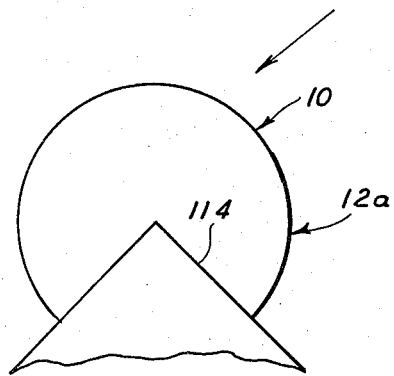
FIG. 6 is an alternative embodiment of the solar collector shown in FIG. 1 wherein the sphere shape has a section cut out to facilitate mounting on a peaked roof.

FIG. 6 is an alternative shape of the solar collector 10 wherein the collecting member 12a has a generally spherical shape with a section removed so that the collector may be mounted, for instance, on a peaked roof 114 of a house. In all other respects, the device may be the same as that shown in FIGS. 1, 2, 3 or 4.

Figure 7:
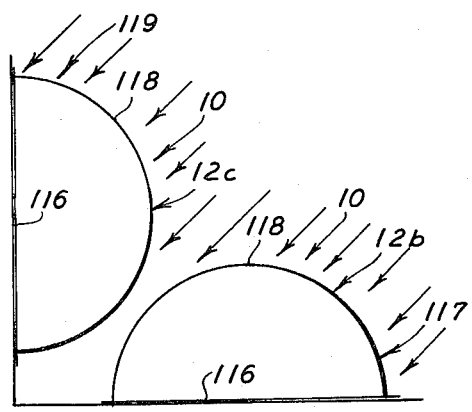
FIG. 7 is an alternative embodiment of the solar collector shown in FIG. 1 utilizing hemispherical shapes having one flat side.
Figure 8:
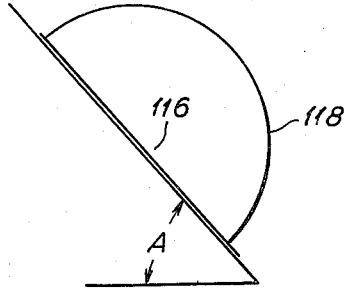
FIG. 8 is an alternative embodiment of the solar collector shown in FIG. 1 utilizing a hemisphere having a flat side positioned at an angle.

FIG. 7 shows an alternative shape of the solar collector 10 wherein a cross section of the collecting member 12b represents a semicircle. A flat side 116 of the hemisphere 12b may be positioned generally away from the sun such as in a horizontal position at 117, for instance, mounted on the ground or on a flat roof, or in a vertical position at 119 for mounting on a vertical wall. The flat section 116 may also be positioned at an angle A as shown in FIG. 8 such that the curved section of the surface 118 would be continuously presented to the sun.

While the present invention has been described as utilizing a collecting member having a spherical or hemispherical shape, it will be appreciated that other nonlinear shapes can be advantageously employed such that any given area on the surface of the collecting member will be perpendicular to the sun at all times during the day and year. The efficiency of the device can be increased by providing that one portion of the collecting surface is continuously at right angles to the sun by means of continuous or intermittent rotation.

There has thus been described a method and means of confining a selected temperature conditioning zone in which to accumulate thermal energy collected off of the confining walls of a curvilinear enclosure such as a sphere.

The zone is selectively flushed with gas or liquid to transfer accumulated thermal energy to a point of utilization.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. An apparatus for collecting solar energy comprising:
   a first rigid hemispherical member;
   a second rigid hemispherical member; said two members each having an opening at the apex and a circumferential flange at the periphery with an exterior surface having a solar heat absorbing coating thereon and being sized identically such that the two members may be joined as a sphere and restraining means associated with said flanges holding said members in fixed assembled relationship;
   an axle member insertable through said apex openings to extend beyond said assembled sphere on at least one end;
   said axle member connected to said sphere assembly by internal support members such that said sphere assembly is mounted on and carried by said axle member;
   at least one support frame to engage said extending end of said axle to support said axle and said carried sphere assembly; and
   means for directing a heat transferring gas into the interior of said sphere assembly to pick up heat energy from said sphere and means for extracting said gas after it has been heated.

2. The device of claim 1 wherein said hemispherical members comprise prefabricated metal silo roof assemblies.

3. The device of claim 1 wherein a portion of the interior of said sphere assembly corresponding to a portion not directly contacted by the sun being insulated to reduce heat loss.

4. The device of claim 1 wherein said means for directing said gas into and extracting said gas out of said sphere assembly comprises coaxial conduits for carrying said gas to minimize heat loss.

5. The device of claim 4 wherein said heated gas is extracted thorugh an inner of said coaxial conduits.

6. The device of claim 5 wherein said inner conduit is connected to a gas pumping means.

7. The device of claim 1 wherein said axle extends through said sphere on both ends and one of said support frames is associated with each axle end to support said axle and said carried sphere assembly.

8. An apparatus for collecting solar energy comprising:
   a first rigid hemispherical member;
   a second rigid hemispherical member;
     said two members each having an opening at the apex and a circumferential flange at the periphery with an exterior surface having a solar heat absorbing coating thereon and being sized identically such that the two members may be joined as a sphere and restraining means associated with said flanges holds said members in fixed assembled relationship;
   said members comprising prefabricated metal silo roof assemblies;
   an axle member insertable through said apex opening to extend beyond said assembled sphere on each side;
     said axle member connected to said sphere assembly by internal support members such that said sphere assembly is mounted on and carried by said axle member;
   at least one support frame on each side of said sphere assembly to engage the extending ends of said axle to support said axle and said carried sphere assembly, and
   means for comprising coaxial conduits for directing a heat transferring gas into the interior of said sphere assembly to pick up heat energy from said sphere and means for extracting said gas after it has been heated.

* * * * *